(12) United States Patent
Niko

(10) Patent No.: US 7,075,574 B2
(45) Date of Patent: Jul. 11, 2006

(54) SHADING CORRECTION CIRCUIT AND DIGITAL CAMERA SIGNAL PROCESSING CIRCUIT USING THE SAME

(75) Inventor: Hidemitsu Niko, Tokyo (JP)

(73) Assignee: NEC Corporation, Tokyo (JP)

( * ) Notice: Subject to any disclaimer, the term of this patent is extended or adjusted under 35 U.S.C. 154(b) by 979 days.

(21) Appl. No.: 10/125,593

(22) Filed: Apr. 19, 2002

(65) Prior Publication Data

US 2002/0167613 A1    Nov. 14, 2002

(30) Foreign Application Priority Data

Apr. 23, 2001   (JP)   ............................. 2001-124910

(51) Int. Cl.
    *H04N 5/217*    (2006.01)
(52) U.S. Cl. .................... 348/241; 348/222.1; 348/251
(58) Field of Classification Search ............... 348/241, 348/222.1, 251; 382/254, 266, 270, 274; 358/532, 483, 3.27
    See application file for complete search history.

(56) References Cited

U.S. PATENT DOCUMENTS 6,028,957 A * 2/2000 Katori et al. ............... 382/162
2002/0126313 A1* 9/2002 Namizuka .................... 358/2.1

FOREIGN PATENT DOCUMENTS

| JP | 63-3569 A | 1/1988 |
| JP | 08-307674 A | 11/1996 |
| JP | 09-224156 A | 8/1997 |

* cited by examiner

*Primary Examiner*—Tuan Ho
*Assistant Examiner*—Gevell Selby
(74) *Attorney, Agent, or Firm*—Sughrue Mion, PLLC

(57) ABSTRACT

A shading correction circuit is disclosed which prevents unevenness and partial dull of an edge caused by noise which remains when noise is sliced using a fixed value as a threshold level to be used for distinction between noise and an edge component. The shading correction circuit includes a level correction circuit for correcting a level of shading, and a noise removal circuit for receiving a level adjusting coefficient used by the level correction circuit and controlling the slice level of level slice to be used to remove an edge component mixed in a noise component with the level adjusting coefficient.

6 Claims, 7 Drawing Sheets

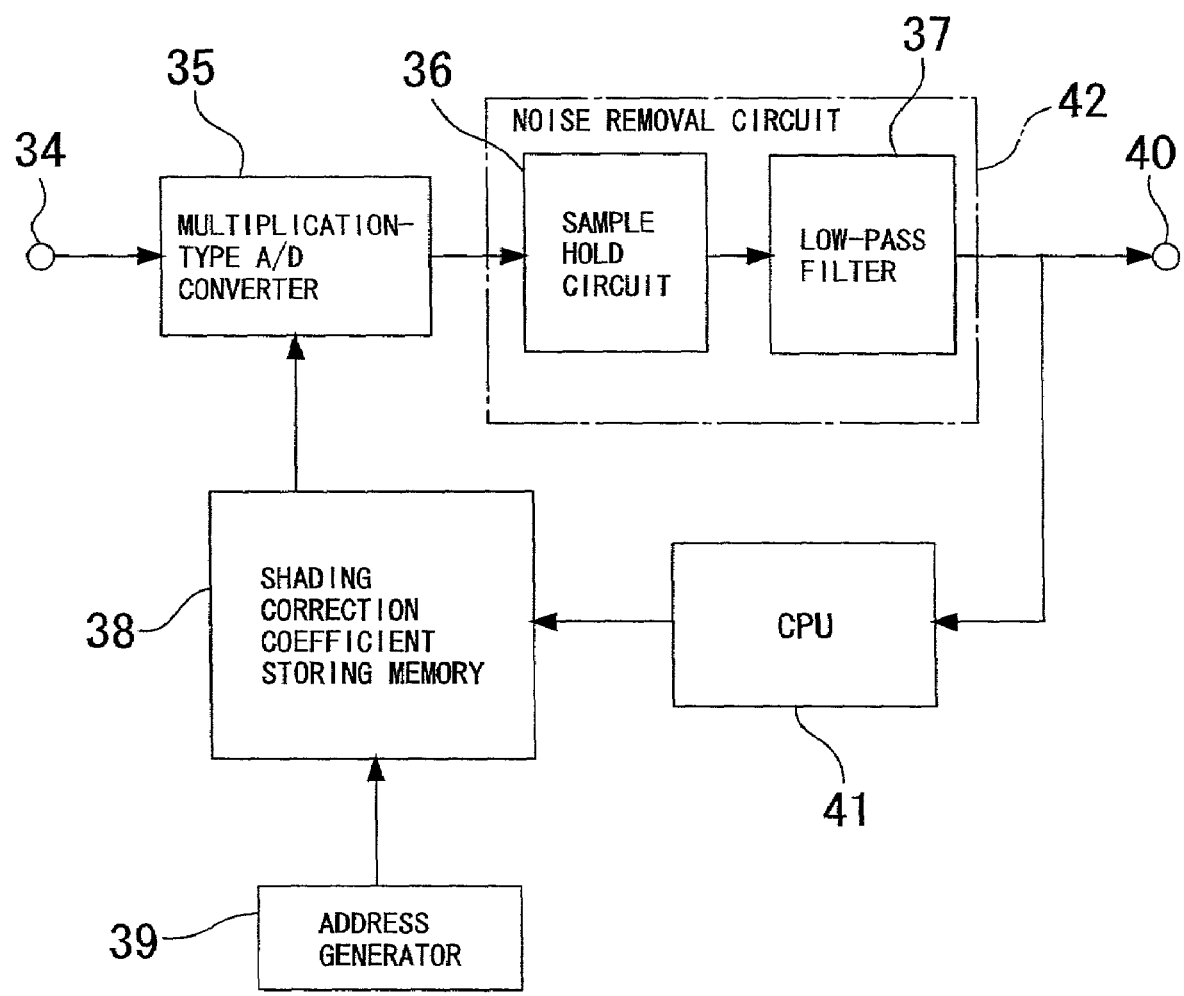

SHADING CORRECTION CIRCUIT AND DIGITAL CAMERA SIGNAL PROCESSING CIRCUIT USING THE SAME

BACKGROUND OF THE INVENTION

1. Field of the Invention

The present invention relates to a shading correction circuit, and more specifically to a shading correction circuit for performing shading correction in digital camera signal processing and a digital camera signal processing circuit which employs the shading correction circuit.

2. Description of the Related Art

Conventionally, shading correction is used only in order to keep the signal level uniform. For example, a circuit which includes a shading level correction circuit and a noise removal circuit independent of each other is disclosed in Japanese Patent Laid-Open No. 003569/1988.

FIG. 7 shows an example of a conventional shading correction circuit. Referring to FIG. 7, the shading correction circuit shown has an input terminal 34 and an output terminal 40 and includes a multiplication type AD converter 35, a noise removal circuit 42 including a sample hold circuit 36 and a low-pass filter 37, a shading correction coefficient storing memory 38, a CPU 41, and an address generator 39. The address generator 39 produces an address for outputting a correction coefficient corresponding to a pixel. The address is connected to an address input of the shading correction coefficient storing memory 38, and the shading correction coefficient storing memory 38 outputs a correction coefficient corresponding to a pixel. The correction coefficient is multiplied by an image signal inputted from the input terminal 34 by the multiplication type AD converter 35. A result of the multiplication is inputted to the sample hold circuit 36 and further inputted to the low-pass filter 37, by which noise of the multiplication result is removed. When a shading correction coefficient is produced, a predetermined value is inputted in advance to the shading correction coefficient storing memory 38, and a signal obtained by picking up an image of uniform surface lighting is inputted from the input terminal 34. Then, the inputted signal is multiplied by a constant by the multiplication type AD converter 35, and noise removal of the signal is performed by the sample hold circuit 36 and the low-pass filter 37. Then, a correction coefficient with which a signal to be inputted to the CPU 41 may be constant is calculated by the CPU 41 and is written into the shading correction coefficient storing memory 38.

However, the conventional shading correction circuit has the following problems.

In shading correction, while one screen is multiplied by different coefficients, since this is simple multiplication, the SN ratio is maintained and the noise level rises. When such simple noise removal means is utilized as in the conventional shading correction circuit, if a filter which can remove amplified noise is applied, then also a band of a video signal is removed. Even if a circuit wherein an edge component is removed by slice processing and a resulting signal which includes only a noise component is subtracted from the original signal is adopted in order to prevent occurrence of such a trouble as just described, since the noise level differs among different portions of an image after the shading correction, if a simple level slice is used, then a noise component and an edge component cannot be separated from each other.

Accordingly, since, in level correction of shading, different coefficients are used for multiplication of pixels at different portions of an image, also the noise level differs among different portions of the image. Therefore, there is a problem that, if a simple noise removal circuit is utilized, then an edge becomes dull and much noise remains at different portions of an image.

SUMMARY OF THE INVENTION

It is an object of the present invention to provide a shading correction circuit which prevents unevenness and partial dull of an edge caused by noise which remains when noise is sliced using a fixed value as a threshold level to be used for distinction between noise and an edge component.

In order to achieve the object described above, according to the present invention, the threshold value to be used for distinction between noise and an edge component is controlled with a shading coefficient so that a slice level optimum for each pixel is applied to the noise component which has different magnitudes at different portions of an image as a result of shading correction.

In particular, according to an aspect of the present invention, there is provided a shading correction circuit, comprising a level correction circuit for correcting a level of shading, and a noise removal circuit for receiving a level adjusting coefficient used by the level correction circuit and controlling a slice level of level slice for removing an edge component mixed in a noise component with the level adjusting coefficient.

Preferably, the noise removal circuit receives a shading correction coefficient used in the level control by the level correction circuit and first and second level adjusting coefficients, and performs level adjustment by multiplying the shading correction coefficient by the first level adjusting coefficient, performs offset adjustment by adding the second level adjusting coefficient to the level-adjusted shading correction coefficient, and then performs the level slice.

Further preferably, the noise removal circuit interlocks the slice level with the shading correction level by multiplying the shading correction coefficient after the level adjustment and the offset adjustment by a level slice signal inputted thereto.

The noise removal circuit may include a first multiplication circuit for performing level adjustment by multiplying the inputted shading correction coefficient by the first level adjusting coefficient, and an addition circuit for performing the offset adjustment by adding an output of the first multiplication circuit and the second level adjusting coefficient.

The noise removal circuit may include a second multiplication circuit for interlocking the slice level with the shading correction level by multiplying the output of the addition circuit by the level slice signal.

According to another aspect of the present invention, there is provided a digital camera signal processing circuit, comprising a shading correction circuit including a level correction circuit for correcting a level of shading and a noise removal circuit for receiving a level adjusting coefficient used by the level correction circuit and controlling a slice level of level slice for removing an edge component mixed in a noise component with the level adjusting coefficient.

The shading correction circuit and the digital camera signal processing circuit are advantageous in that unevenness and partial dull of an edge of an image caused by noise which remains when noise is sliced using a fixed value as a threshold level to be used for distinction between noise and an edge component.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 7 is a block diagram showing an example of a conventional shading correction circuit.

DESCRIPTION OF THE PREFERRED EMBODIMENT

A shading correction circuit according to the present invention is basically configured such that a noise removal circuit operates in an interlocking relationship with shading correction in digital camera signal processing.

More particularly, a coefficient to be used for correction of the level of shading is inputted also to a noise removal circuit and the slice level of level slice for removing an edge component mixed in a noise component is controlled to remove the edge component using the effective slice level thereby to achieve shading correction interlocked with a noise removal circuit without making an image edge dull and without allowing much noise to remain.

Figure 1:
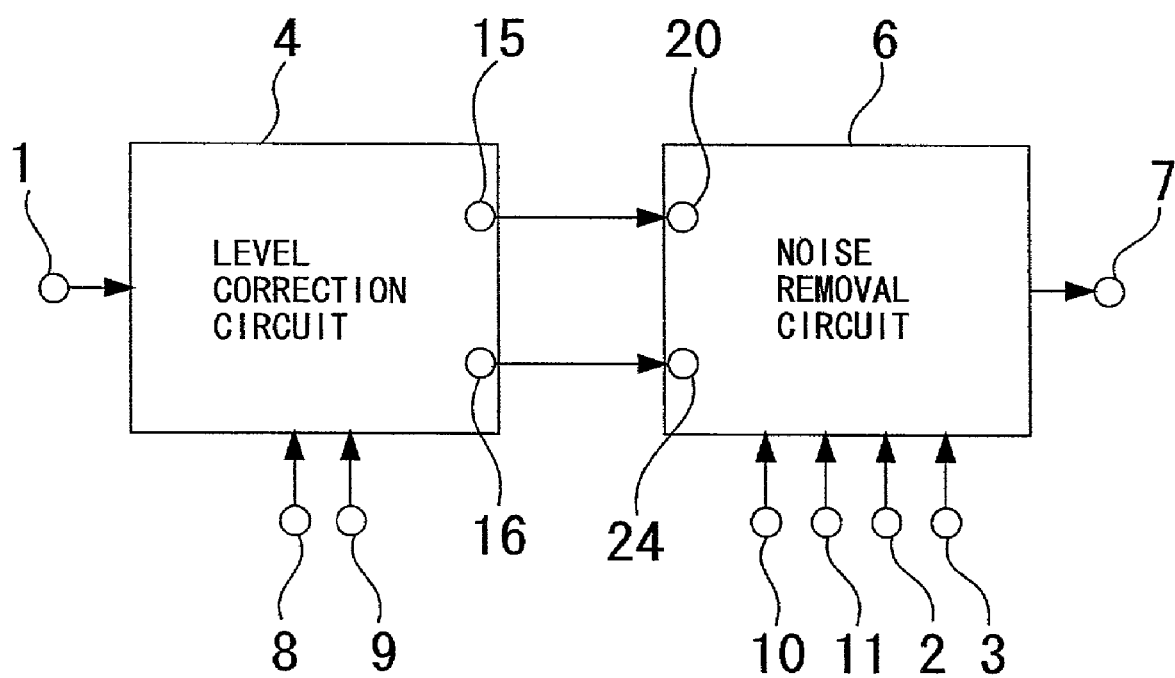
FIG. 1 is a block diagram showing a configuration of a shading correction circuit to which the present invention is applied.

Referring to FIG. 1, there is shown a shading correction circuit to which the present embodiment is applied. The shading correction circuit includes a level correction circuit 4 and a noise removal circuit 6. The level correction circuit 4 has input terminals 1, 8 and 9 and output terminals 15 and 16. The noise removal circuit 6 has input terminals 20, 24, 2, 3, 10 and 11 and an output terminal 7.

A video signal S5 (refer to FIG. 4) is inputted to the input terminal 1 of the level correction circuit 4, and a pixel clock S1 and a frame synchronization signal S2 (both refer to FIG. 4) are inputted through the input terminals 8 and 9, respectively. The level correction circuit 4 performs level correction for shading, and the video signal after the level correction is inputted from the output terminal 16 of the level correction circuit 4 to the input terminal 24 of the noise removal circuit 6. Also a shading correction coefficient S4 (refer to FIG. 4) used for the level control is outputted from the output terminal 15 of the level correction circuit 4 and inputted to the input terminal 20 of the noise removal circuit 6. Further, separate from the shading correction coefficient S4, three different coefficients for level adjustment and a coefficient of the noise slice level are inputted to the input terminals 2, 3, 10 and 11 of the noise removal circuit 6. The noise removal circuit 6 performs noise removal corresponding to the strength of the shading correction, and the signal after the noise removal is outputted from the output terminal 7.

Figure 2:
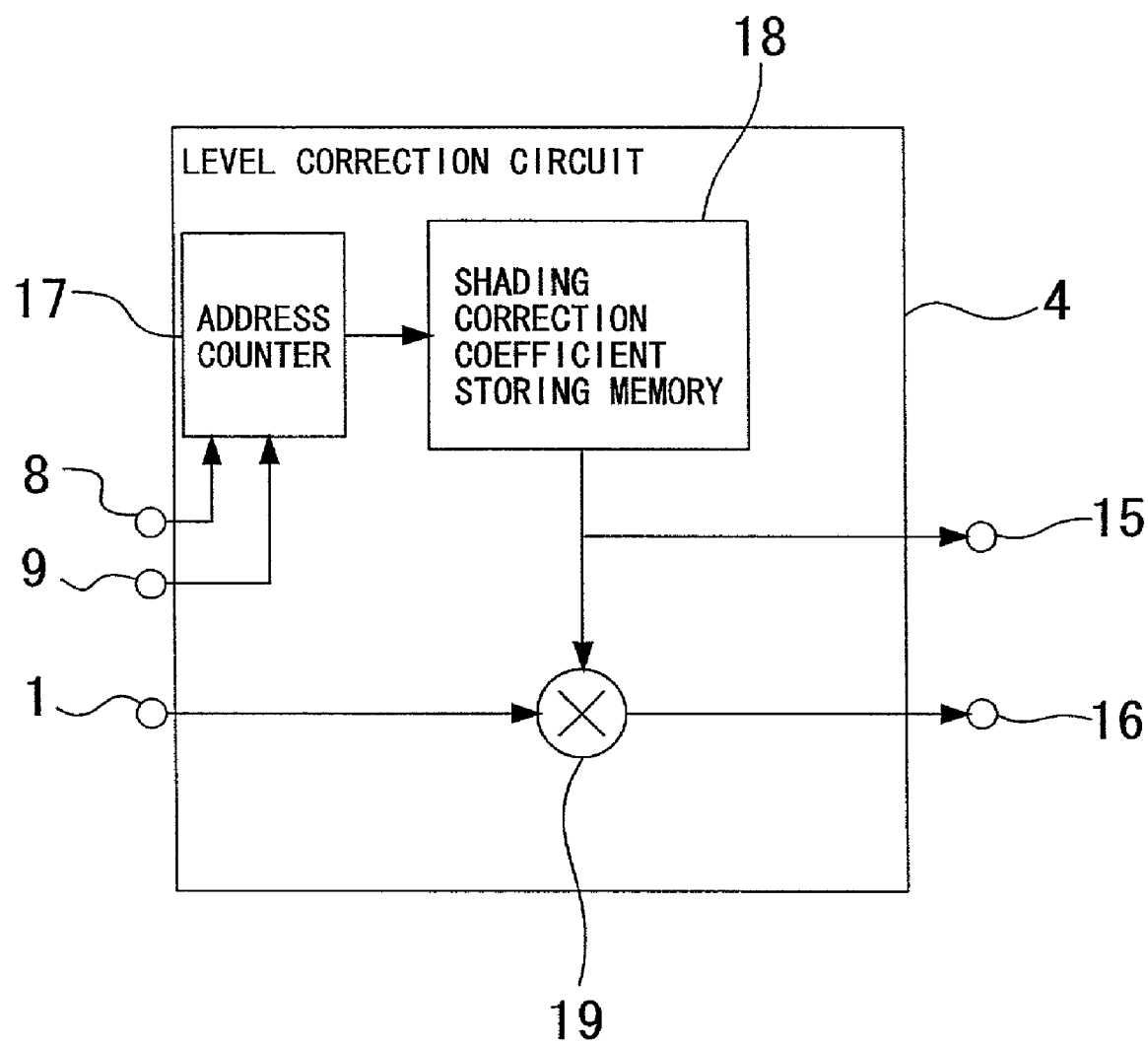
FIG. 2 is a block diagram showing a configuration of a level correction circuit shown in FIG. 1.

Referring to FIG. 2, the level correction circuit 4 includes an address counter 17, a shading correction coefficient storing memory 18, and a multiplication circuit 19.

The pixel clock S1 inputted through the input terminal 8 and the frame synchronization signal S2 inputted through the input terminal 9 are inputted to the address counter 17. The address counter 17 counts up in response to the pixel clock S1 and is reset in response to the frame synchronization signal S2. An output signal S3 (refer to FIG. 4) of the address counter 17 is inputted to the shading correction coefficient storing memory 18. The shading correction coefficient storing memory 18 outputs the shading correction coefficient S4 corresponding to the inputted address, that is, corresponding to a pixel. An output signal of the shading correction coefficient storing memory 18 is outputted from the output terminal 15. The output signal is inputted also to the multiplication circuit 19 and multiplied by the video signal S5 inputted through the input terminal 1 by the multiplication circuit 19. As a result, a shading-corrected signal (video signal S6 (refer to FIG. 4)) is outputted from the output terminal 16.

Figure 3:
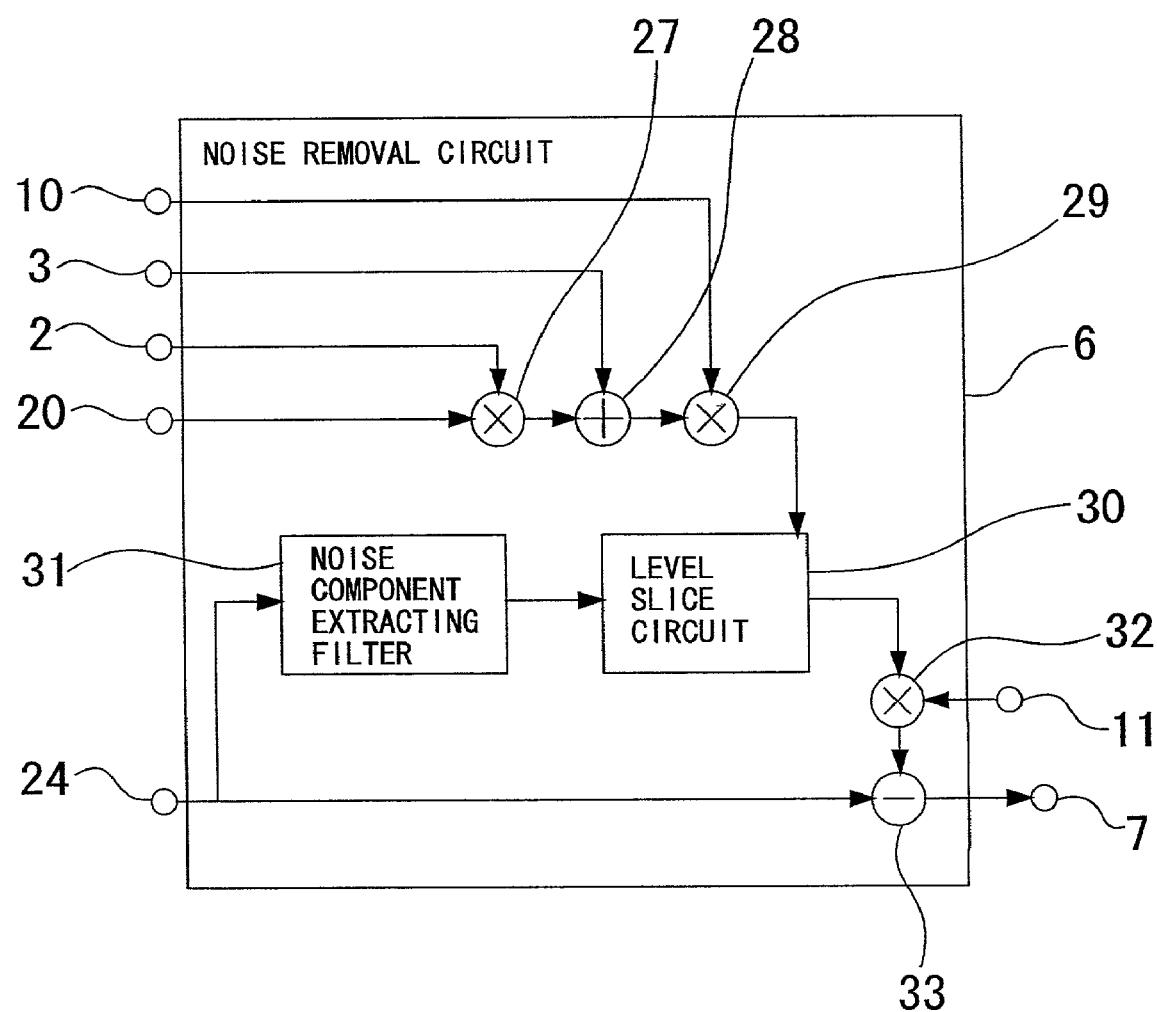
FIG. 3 is a block diagram showing a configuration of a noise removal circuit shown in FIG. 1.

Referring now to FIG. 3, the noise removal circuit 6 is includes multiplication circuits 27, 29 and 32, an addition circuit 28, a level slice circuit 30, a noise component extracting filter 31, and a subtraction circuit 33. The input terminal 20 of the noise removal circuit 6 is connected to the output terminal 15 of the level correction circuit 4. The other input terminal 24 of the noise removal circuit 6 is connected to the output terminal 16 of the level correction circuit 4.

The shading correction coefficient S4 inputted from the input terminal 20 is multiplied by the coefficient for level adjustment inputted through the input terminal 2 so as to adjust the level thereof. Then, a result of the multiplication is added to the level adjustment coefficient inputted through the input terminal 3 by the addition circuit 28 to adjust the offset thereof. Further, a result of the addition is multiplied by the level slice signal inputted through the input terminal 10 by the multiplication circuit 29 to interlock the slice level with the shading correction level. Furthermore, a result of the multiplication is inputted to a slice level input terminal of the level slice circuit 30. A resulting signal calculated by the multiplication circuit 29 and the noise component calculated from the video signal S6 inputted through the input terminal 24 by the noise component extracting filter 31 are inputted to the level slice circuit 30. Level slice is performed for the inputted noise component by the level slice circuit 30. An output signal of the level slice circuit 30 is multiplied by a coefficient for determination of the strength of the noise removal inputted through from the input terminal 11 by the multiplication circuit 32. Then, a result of the multiplication is inputted to a subtrahend input of the subtraction circuit 33. Further, the video signal S6 inputted through the input terminal 24 is inputted to a minuend input terminal of the subtraction circuit 33. The subtraction circuit 33 thus subtracts the subtrahend input from the minuend input. An output of the subtraction circuit 33 is outputted from the output terminal 7.

The address counter 17, shading correction coefficient storing memory 18 and multiplication circuit 19 of FIG. 2 and the multiplication circuits 27, 29 and 32, addition circuit 28, level slice circuit 30, noise component extracting filter 31 and subtraction circuit 33 of FIG. 3 are well known to those skilled in the art. Therefore, detailed description of the configuration of them is omitted herein.

Figure 4:
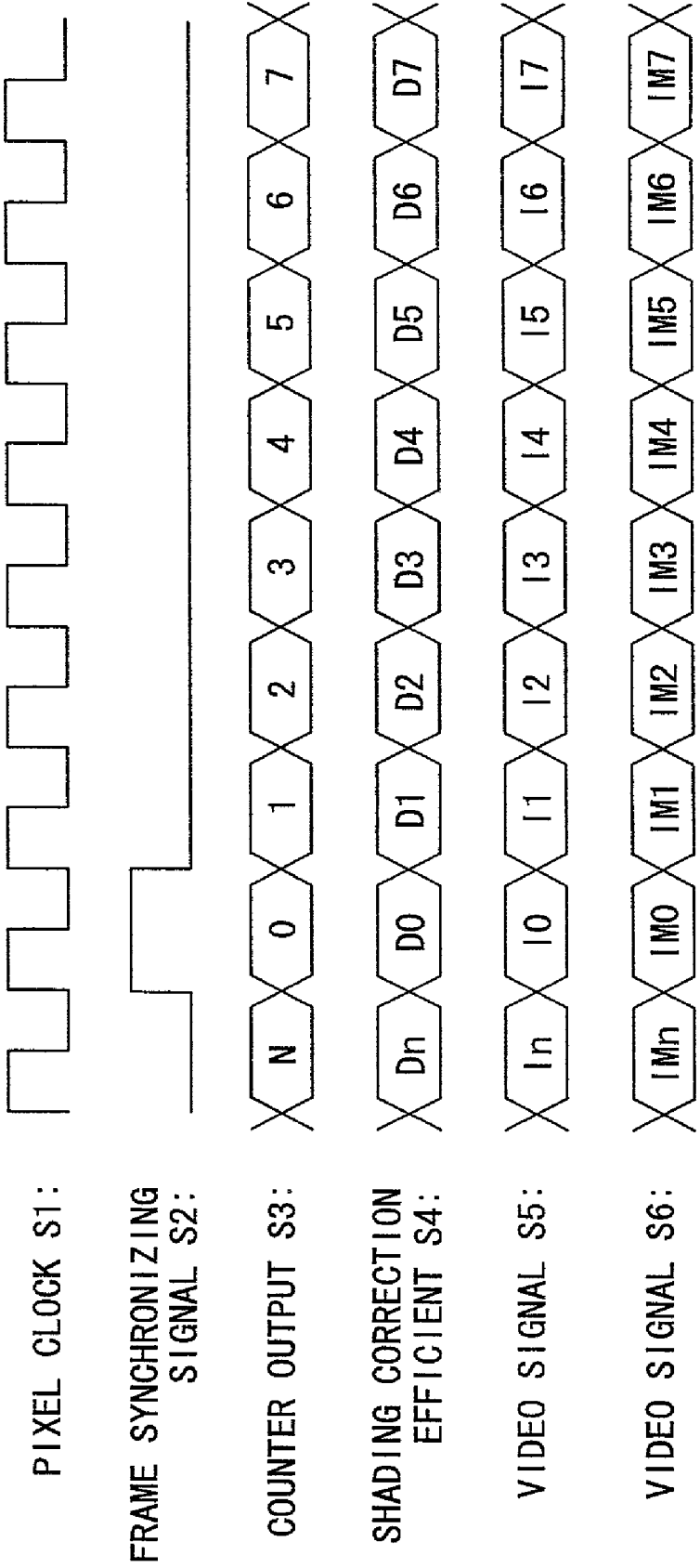
FIG. 4 is a timing chart illustrating operation of the level correction circuit of FIG. 2.

Operation of the shading correction circuit is described below. FIG. 4 illustrates operation of the level correction circuit 4 of FIG. 2. The pixel clock S1 is inputted through the input terminal 8 and the frame synchronization signal S2 is inputted through the input terminal 9.

The address counter 17 counts up in synchronism with the pixel clock S1, and is reset in response to the frame synchronization signal S2 and outputs a counter output signal S3. The counter output signal S3 is inputted to the shading correction coefficient storing memory 18, by which it is converted into the shading correction coefficient S4. A video signal S5 synchronized with the pixel clock S1 is inputted through the input terminal 1. The video signal S5 and the shading correction coefficient S4 are multiplied by the multiplication circuit 19 thereby to form a video signal S6. The video signal S6 is outputted from the output terminal 16.

An inverse characteristic to the shading of a corresponding pixel is stored in the shading correction coefficient storing memory 18 and multiplied by the shading correction coefficient S4 corresponding to the pixel clock S1 which has inputted been through the input terminal 8. Consequently, an image signal which does not have unevenness can be obtained.

Where an image sensor which has color filters for the primary colors is used, the shading correction coefficient S4 is stored, where the RGB color signal level of a signal obtained by picking up an image of a homogeneous surface light source is represented as IMGn (n=0, 1, 2 . . . ) and the frame average levels of the colors of the pixels are represented as IMG_Ra, IMG_Ga and IMG_Ba, as IMG_Ra/IMGn for a pixel corresponding to the red filter, IMG_Ga/IMGn for a pixel corresponding to the green filter and IMG_Ba/IMGn for a pixel corresponding to the blue filter into the shading correction coefficient storing memory 18.

Figure 5:
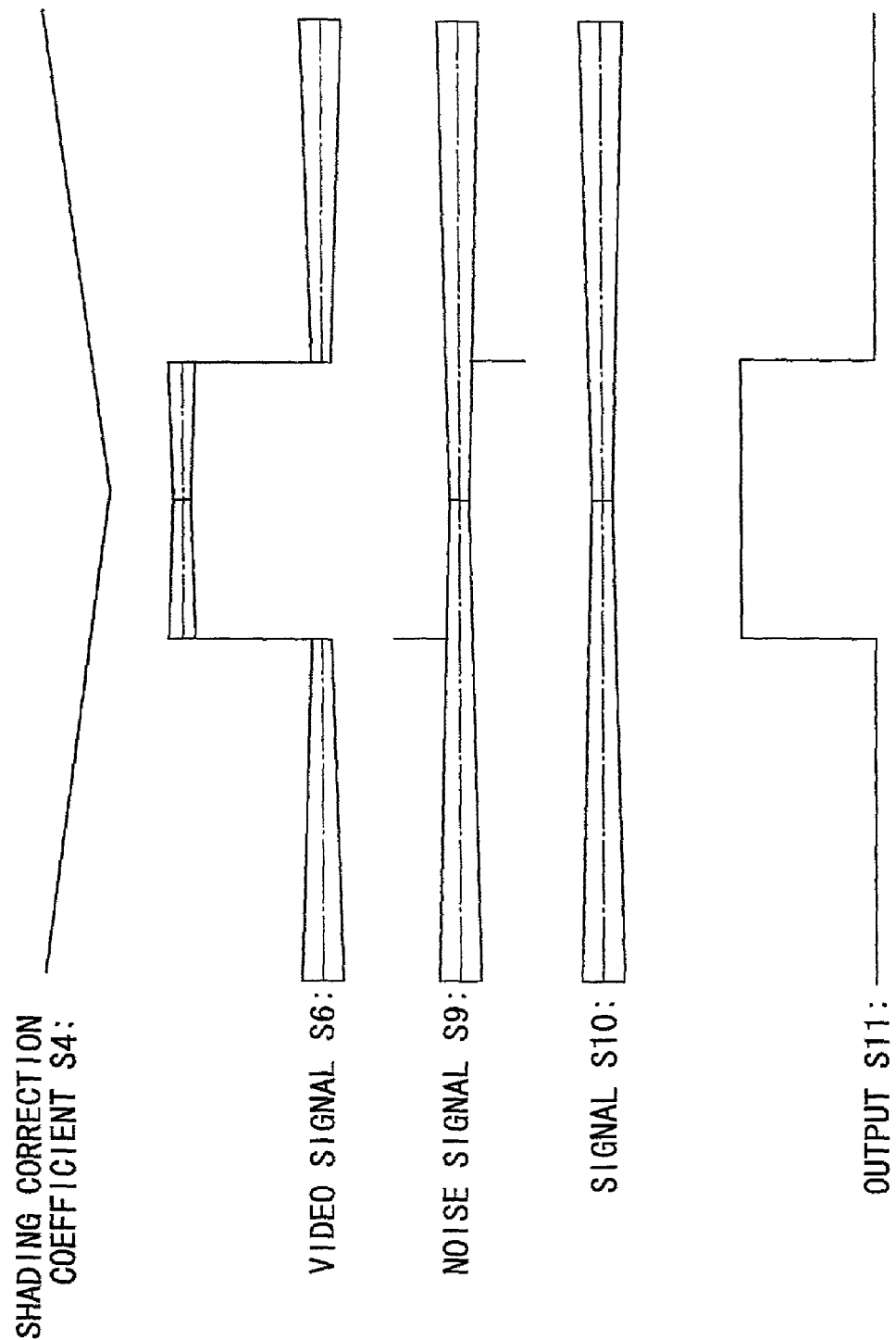
FIG. 5 is a timing chart illustrating operation of the noise removal circuit of FIG. 3.

Therefore, the noise removal circuit 6 of FIG. 3 operates in accordance with the timing chart of FIG. 5. The level corrected video signal S6 is inputted through the input terminal 24, and the shading correction coefficient S4 is inputted through the input terminal 20. Since the gain control has been performed for the video signal S6 with the shading correction coefficient S4, also the noise has an amplified level. The noise component extraction filter 31 extracts the noise component from the video signal S6 to obtain a noise signal S9. The shading correction coefficient S4 is arithmetically operated with the coefficients inputted through the input terminals 2 and 3 by the multiplication circuit 27 and the addition circuit 28 so that the level thereof is adjusted. The level adjusted shading correction coefficient is multiplied by the slice level (level slice signal) inputted from the input terminal 10, and a resulting signal is inputted to the level slice circuit 30. The noise signal S9 is level sliced by the level slice circuit 30 to form a signal S10. The signal S10 is multiplied by a coefficient for determination of the strength of noise removal inputted through the input terminal 11, and a resulting signal is subtracted from the video signal S6 inputted through the input terminal 24 to form an output signal S11.

Since the shading correction circuit according to the present embodiment is configured in such a manner as described above, the advantages described below are achieved successfully.

With the shading correction circuit, since the slice level of level slice to be used to remove an edge component is made correspond to the shading correction coefficient, the noise level by which only part of an image is emphasized can be uniformed by the shading correction.

The foregoing can be achieved by the fact that the slice level of noise is interlocked with the shading correction coefficient. The shading correction circuit solves the problem that, if the slice level is adjusted to the noise level emphasized without such interlocking as just described, then an edge of a signal which is not noise is removed, but if a normal noise level is used, then noise of an emphasized portion remains.

Figure 6:
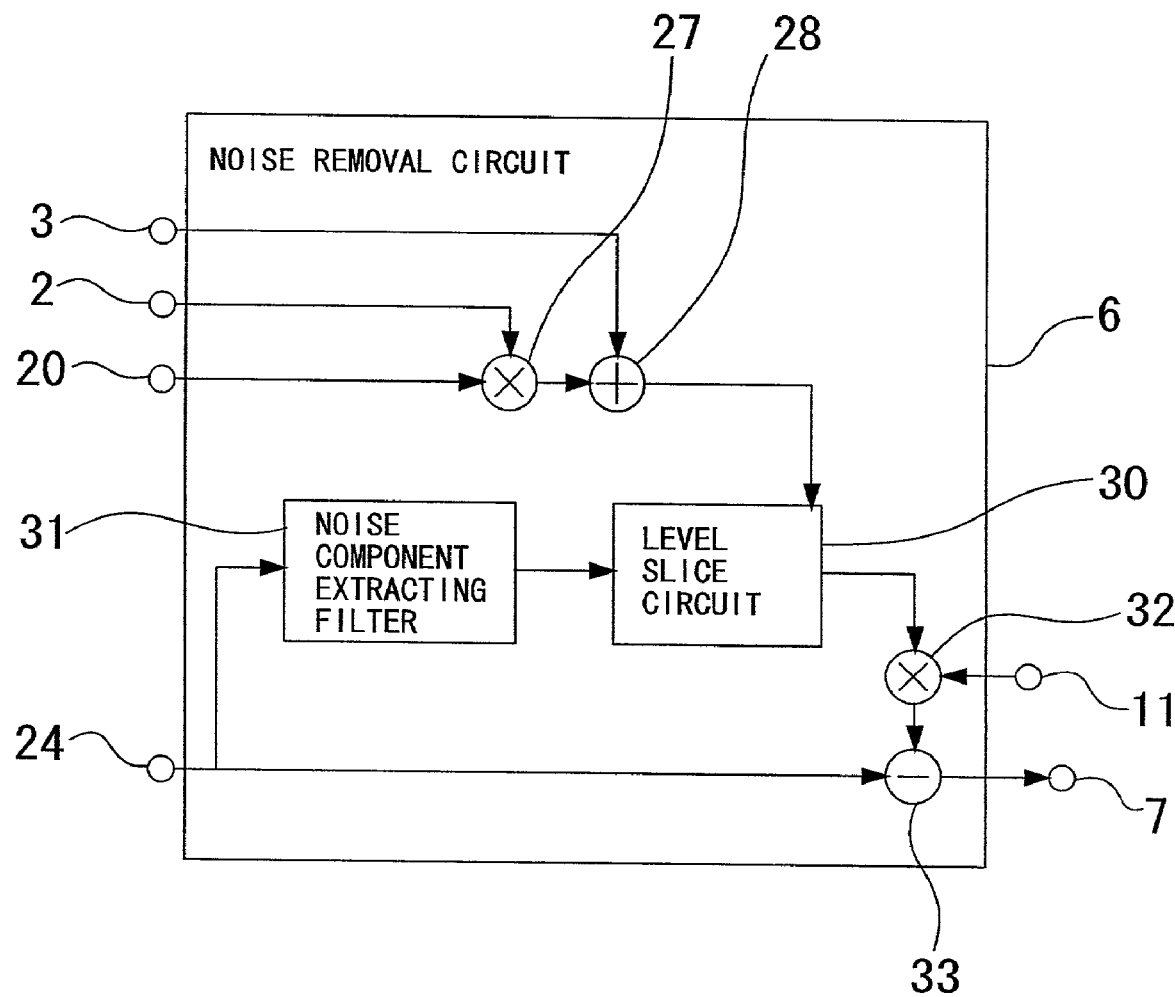
FIG. 6 is a block diagram showing another configuration of the noise removal circuit shown in FIG. 1.

A modification to the noise removal circuit of FIG. 3 is shown in FIG. 6. Referring to FIG. 6, the modified noise removal circuit is different from the noise removal circuit of FIG. 3 in that it does not have the multiplication circuit 29 and the input terminal 10 shown in FIG. 3 and the output of the addition circuit 28 is directly inputted to the level slice circuit 30. In the noise removal circuit having the configuration shown in FIG. 6, not the slice level is adjusted using a shading correction coefficient, but level adjustment is performed for the shading correction coefficient to obtain a slice level.

Accordingly, the modified shading correction circuit can achieve an advantage that, since the multiplication circuit can be eliminated from the shading correction circuit, reduction of the circuit scale can be anticipated.

While a preferred embodiment of the present invention has been described using specific terms, such description is for illustrative purposes only, and it is to be understood that changes and variations may be made without departing from the spirit or scope of the following claims.

What is claimed is:

1. A shading correction circuit, comprising:
    a level correction circuit for correcting a level of shading; and
    a noise removal circuit for receiving a level adjusting coefficient used by said level correction circuit and controlling a slice level of level slice for removing an edge component mixed in a noise component with the level adjusting coefficient.

2. A shading correction circuit as claimed in claim 1, wherein said noise removal circuit receives a shading correction coefficient used in the level control by said level correction circuit and first and second level adjusting coefficients, and performs level adjustment by multiplying the shading correction coefficient by the first level adjusting coefficient, performs offset adjustment by adding the second level adjusting coefficient to the level-adjusted shading correction coefficient, and then performs the level slice.

3. A shading correction circuit as claimed in claim 2, wherein said noise removal circuit interlocks the slice level with the shading correction level by multiplying the shading correction coefficient after the level adjustment and the offset adjustment by a level slice signal inputted thereto.

4. A shading correction circuit as claimed in claim 2, wherein said noise removal circuit includes:
    a first multiplication circuit for performing level adjustment by multiplying the inputted shading correction coefficient by the first level adjusting coefficient; and
    an addition circuit for performing the offset adjustment by adding an output of said first multiplication circuit and the second level adjusting coefficient.

5. A shading correction circuit as claimed in claim 4, wherein said noise removal circuit includes a second multiplication circuit for interlocking the slice level with the shading correction level by multiplying the output of said addition circuit by the level slice signal.

6. A digital camera signal processing circuit, comprising:
    a shading correction circuit including a level correction circuit for correcting a level of shading and a noise removal circuit for receiving a level adjusting coefficient used by said level correction circuit and controlling a slice level of level slice for removing an edge component mixed in a noise component with the level adjusting coefficient.

* * * * *